United States Patent
Zhang et al.

(10) Patent No.: US 9,710,581 B1
(45) Date of Patent: Jul. 18, 2017

(54) VIP ASSISTED METHOD AND APPARATUS TO ENABLE SOC INTEGRATION AND SOFTWARE DEVELOPMENT

(71) Applicant: Cadence Design Systems, Inc., San Jose, CA (US)

(72) Inventors: David Guoqing Zhang, Fremont, CA (US); Erik S. Panu, Los Gatos, CA (US)

(73) Assignee: Cadence Design Systems, Inc., San Jose, CA (US)

(*) Notice: Subject to any disclaimer, the term of this patent is extended or adjusted under 35 U.S.C. 154(b) by 273 days.

(21) Appl. No.: 14/579,995

(22) Filed: Dec. 22, 2014

(51) Int. Cl.
*G06F 17/50* (2006.01)

(52) U.S. Cl.
CPC .............................. *G06F 17/5045* (2013.01)

(58) Field of Classification Search
CPC .................................................. G06F 17/5045
USPC .................................................... 716/102
See application file for complete search history.

(56) References Cited

U.S. PATENT DOCUMENTS

| | | | |
|---|---|---|---|
| 6,993,469 B1* | 1/2006 | Bortfeld | G06F 17/5022 703/13 |
| 2004/0133821 A1* | 7/2004 | Shortz | G06F 11/3664 714/38.11 |
| 2005/0209840 A1* | 9/2005 | Baklashov | G06F 17/504 703/22 |
| 2008/0189086 A1* | 8/2008 | Ford | G06F 17/5045 703/2 |

* cited by examiner

*Primary Examiner* — Jack Chiang
*Assistant Examiner* — Brandon Bowers
(74) *Attorney, Agent, or Firm* — Andrews Kurth Kenyon LLP (57) ABSTRACT

Using verification IP (VIP), the related design IP (DIP) can be integrated into a system on a chip (SOC) without requiring the IP component. Using a normalized framework, a software module can be integrated into the VIP software stack enabling the customized management of the VIP beyond the standard specification defined behaviors. Then, the modified software stack can be used to manage both behaviors defined by the specification and the design specific behaviors. The VIP can then be used in place of the DIP for SOC development.

20 Claims, 5 Drawing Sheets

VIP ASSISTED METHOD AND APPARATUS TO ENABLE SOC INTEGRATION AND SOFTWARE DEVELOPMENT

BACKGROUND

Aspects of the present invention relate generally to integrated circuit designs, and in particular to techniques for simulation and test of such designs.

Hardware designers, for example integrated circuit (IC) designers, do not always design every component of a new hardware device. While designers may design one or more components of a particular device, they often employ component designs (also known as intellectual property, or IP) from one or more third-party IP providers. Using components from third-party IP providers can facilitate the design by avoiding the need for the designer to design every aspect of the device's functionality.

Hardware designers may employ a hardware based verification platform to perform certain operations on a design. Hardware verification platforms can enable testing of the various components of the design which facilitates design analysis and debugging. Multiple aspects of the hardware design typically may be tested. For example, a hardware design may undergo architectural simulation and analysis and debugging where the functionality of each of the components being implemented in the design is tested, for example, with transaction level modeling (TLM) or bus functional modeling. The hardware design may additionally undergo circuit simulation and analysis where the signals between components are tested, for example using register transition level (RTL) analysis. Other steps may include system simulation, for example to model the components of a system together, and system and software emulation, for example to model execution of software elements executing on a modeled system. Once a design is completed, one or more physical components of the device may be tested and verified.

A programming model can be used during verification and simulation and may be defined according to a specification for the IP component undergoing testing. A conventional programming model definition for a third party IP component includes a set of register accesses. The definition will include two types of accesses: a definition for the protocol related register accesses (e.g. reset), and a definition for design specific register accesses (e.g. power domain management).

Using this programming model, a software stack, such as firmware or a bare-metal driver, will be developed to manage IP component behaviors during testing. However, although the specification details may be utilized to verify certain accesses of the IP component, certain other actions of the IP component, such as design specific register accesses, cannot be generalized or abstracted, and therefore are not captured in a specification or protocol. Therefore, complete testing often requires a device specific driver.

Furthermore, during the conventional development of a programming model for a third party IP component, the programming model is defined and tested without specific knowledge of the target system-on-a-chip (SOC). When an IP component is integrated into an SOC, the IP component related programming model is consumed into the programming model for the SOC, on top of which the SOC software can then be developed and tested.

However, when developing SOC software that utilizes the IP component, and integrating the IP component into the associated SOC, the IP component related programming model and the defined requirements for the SOC may have gaps in functionality and control. Therefore, although the IP component programming model may have been individually tested and verified, it is also necessary to test and verify a corresponding programming model at the SOC level. This process consumes resources and time. Additionally, when testing the SOC software, changes to the design IP (DIP) definition may be needed, requiring the partial re-writing of the software stack and complete re-testing of the DIP programming model.

As a result, multiple modules and interfaces, as well as entirely new drivers, are often created to simulate a driver and interface associated with the IP component. However, driver development is error-prone and time consuming. Additionally, certain aspects of the testing cannot be completed until the IP component, and the system on a chip (SOC) on which the IP component is implemented, have been created.

Therefore, there is a need for a standardized programming model definition that can be used throughout the verification and testing process.

BRIEF DESCRIPTION OF THE DRAWINGS

The foregoing and other aspects of various embodiments of the present invention will be apparent through examination of the following detailed description thereof in conjunction with the accompanying drawing figures in which similar reference numbers are used to indicate functionally similar elements.

DETAILED DESCRIPTION

A design or system under test may contain at least one IP component that may be a third party IP component. Verification IP (VIP) and design IP (DIP) for the IP component can be developed to represent the component and aid the verification, simulation, and testing of the design. The verification content generated during the creation of the design may be used to create VIP for the IP component. Verification concepts referenced in this application are described in more detail in U.S. patent application Ser. No. 13/929,277 filed on Jun. 27, 2013 and in U.S. patent application Ser. No. 13/964,846 filed on Aug. 12, 2013; these applications are incorporated in this application in their entirety.

Using VIP and a normalized framework, a new software module can be integrated into the VIP software stack, enabling the customized management of the VIP beyond the typical and standard protocol centric behaviors. Then, the modified software stack can be used to manage both behaviors defined by the specification and the design specific accesses. By combining both the normalized VIP programming model that is based on the protocol specification and the normalized software integration framework, VIP can be used in place of the DIP for SOC development, and the related DIP can be integrated into an SOC without requiring the complete, physical DIP.

Figure 1:
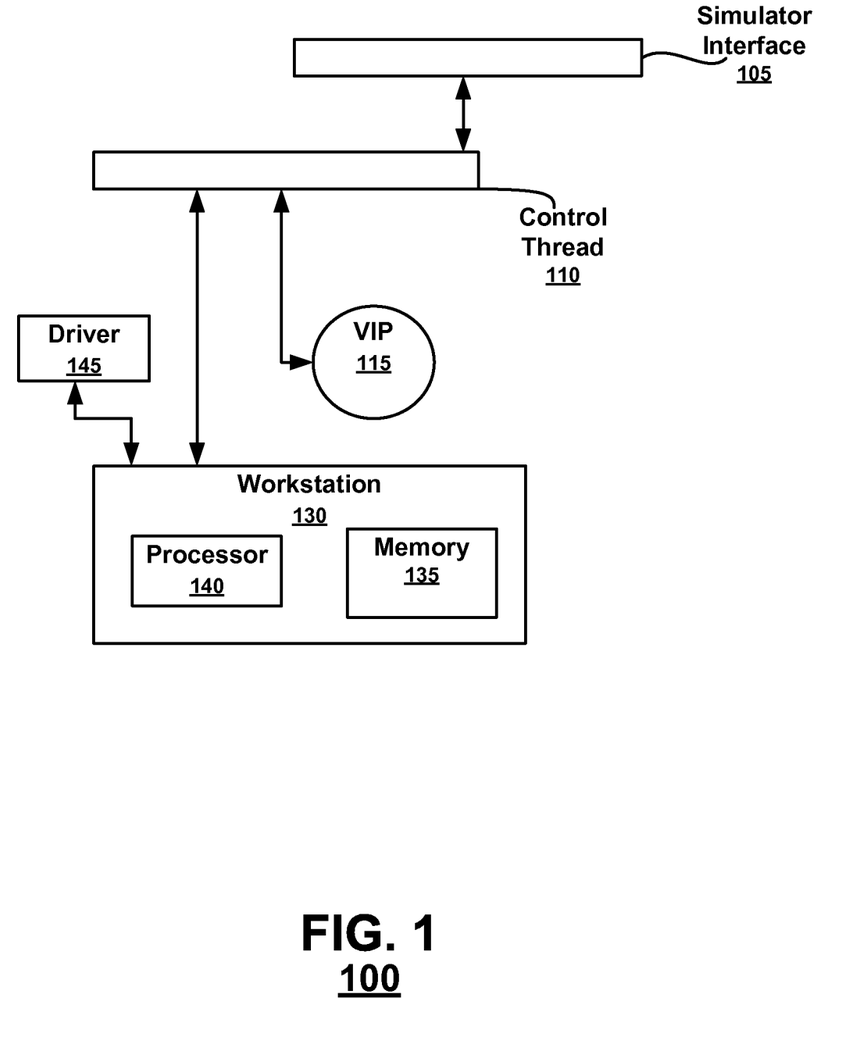
FIG. 1 illustrates an exemplary verification platform according to an embodiment.

FIG. 1 illustrates an exemplary simulation platform 100 according to an embodiment. The simulation platform 100 shown in FIG. 1 is implemented to test that a design for a hardware component or SOC design conforms to the standards for one or more specifications implemented within the design.

Figure 2:
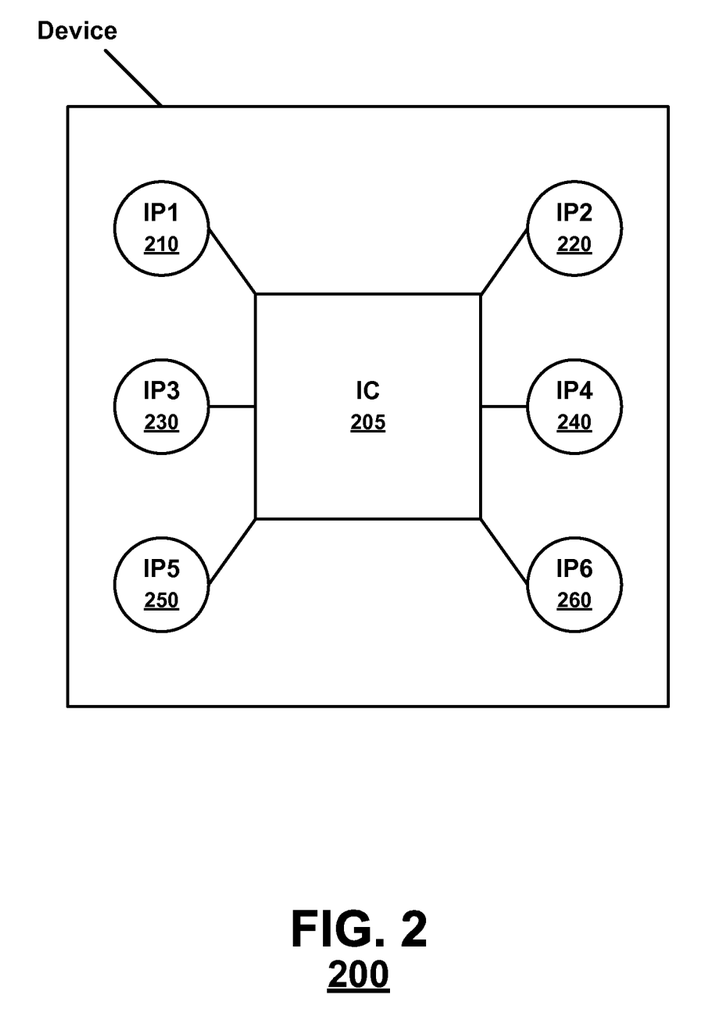
FIG. 2 is a simple block diagram illustrating an exemplary hardware design that may be tested with the verification platform according to an embodiment.

FIG. 2 is a simple block diagram illustrating an exemplary hardware design 200 that may be tested with the simulation platform according to an embodiment of the present invention. The hardware design 200 may be a design for any hardware component or device, for example a mobile phone (including but not limited to a smartphone), a tablet, or a computer of some kind. The device includes one or more ICs 205 with IP components IP1-IP6 210-260. For example a smartphone could include multiple IP components such as memory (static or dynamic, general-purpose or special-purpose); graphics processing; audio; video; power management; various wired communication and/or bus protocols including but not limited to PCI Express, members of the PCI Express family, and/or variants thereof, in different applications depending on the data communications need; wireless communications protocols including but not limited to cellular (e.g. GSM/CDMA), Bluetooth™, Wi-Fi (some form of 802.11), WIMAX (some form of 802.16); various connection protocols including but not limited to different forms of USB (different versions, micro-USB, mini-USB, and the like), video connection protocols (e.g. Thunderbolt (which might be one example of a PCI Express application), HDMI, or others) or other connector types which may or may not be proprietary; and/or image processing (e.g. on-board camera functionality). All of these various elements could be provided in a single design (for example, in a system on a chip, or other design incorporating IP from multiple providers, or multiple types of IP from a single provider), or could be contained in multiple designs.

While some of the IP components mentioned above may be proprietary, a number of them may be developed according to a standard, be it wired or wireless communications, audio, video, memory, or others. Different IP providers can and will have different ways of implementing a particular standard. It should be noted that there may be portions of a standard for which compliance is mandatory, and other portions for which compliance is optional. The hardware designer may have a particular feature set in mind, in which compliance either with only mandatory portions of the standard, or with mandatory and certain optional portions of the standard, would be necessary.

Where a standard such as Bluetooth™, Wi-Fi, other communications, memory management, display, or other functionality in a device is implicated, verification of the design may include showing compliance with the standard. Where the functionality in question is the result of proprietary third party IP which does not necessarily follow a particular standard, the IP provider may disclose an interface definition or custom protocol, without the IP provider revealing its proprietary information. The standards or provided definitions may then be utilized by a simulation platform to show that the components of the design execute properly or to otherwise identify errors.

In the case of IP that is designed to provide particular functionality, but in accordance with a proprietary design or feature set rather than a standard, outputs of the design will be a proprietary function of the inputs. An IP provider may be able to provide a custom specification consisting of design-based sets of inputs and corresponding outputs, making it possible to exercise the design through a selection of various combinations of inputs without revealing proprietary aspects of the IP component. VIP for the IP component may then be created based on the custom specification.

Returning to FIG. 1, according to an exemplary embodiment, VIP 115 may be provided that uses the verification and protocol knowledge developed and utilized during earlier design and verification phases of the system and DIP to simulate the IP component.

The verification and protocol knowledge may include objects generated from one or more standards or other specifications implemented by the design. For example, the generated objects may include a single VIP, a collection of VIPs, or a combination of DIPs and VIPs that are part of a design. Objects for a specification may be defined and utilized during any stage of the design verification process. For example, the generated objects may be used during architectural development to confirm that the IP component interconnections represented by associations between objects conform to the specification. Similarly, the objects may be used during IP component simulation, system emulation, debugging, or post-silicon analysis to confirm that the components of the design conform to the specification during execution.

In FIG. 1, a simulator interface 105 is implemented to provide control and observability for the components of the platform 100. The simulator interface 105 is executed on a control thread 110 within a computer, processor, or workstation on which the simulator is executed. The simulator interface 105 may run in a control thread 110 separate from the components of the virtual platform. State information and other simulation related information for the components, including a VIP or DIP object 115, then may be made available via simulation commands executed by the control thread 110 when control of the simulation returns to the control thread 110. In FIG. 1, modeling information may be stored in a memory storage device 135 of the workstation 140.

A driver interface and an associated driver software stack 145 may be provided to provide an interface consistent with the specification for testing and verification of the VIP and DIP. The driver 145 sets out constraints for the design to ensure conformance to the specification. The driver 145 may also be used to facilitate verification of the DIP when the DIP interfaces with the driver 145 during simulation.

Figure 3:
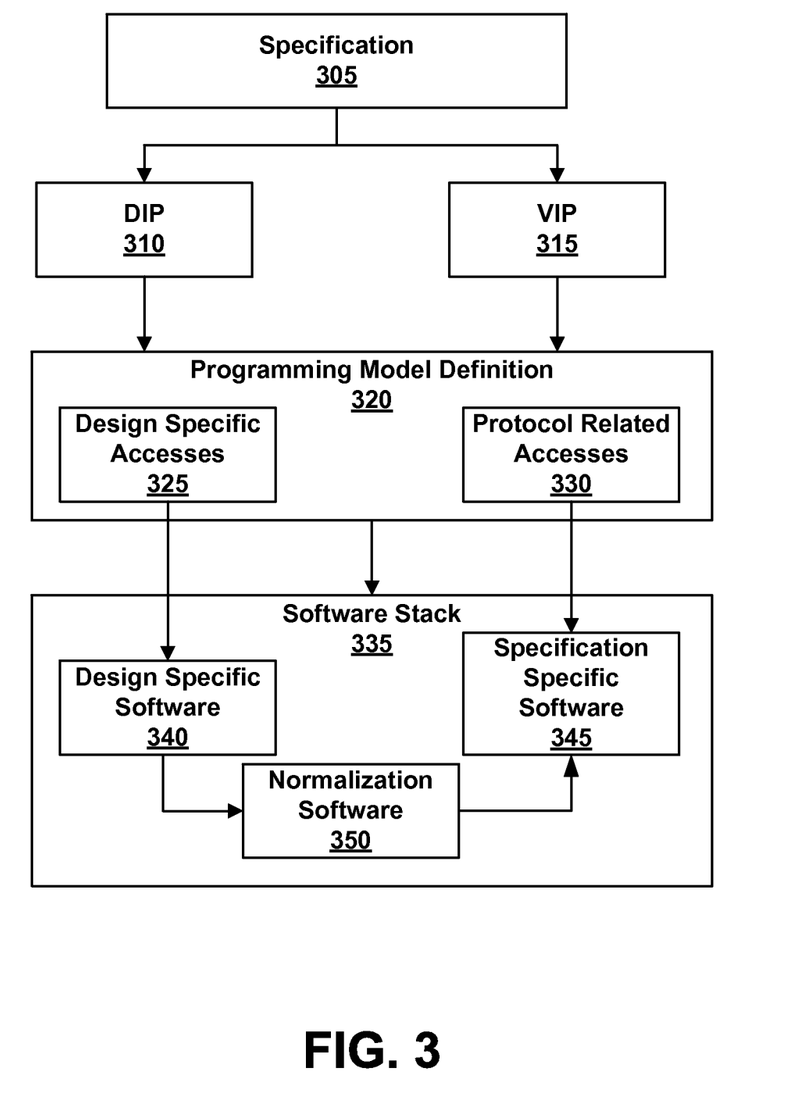
FIG. 3 is a simplified flow diagram that illustrates exemplary development of a software stack to manage both verification IP and design IP according to an embodiment.

FIG. 3 is a simplified flow diagram that illustrates exemplary development of a software stack to manage both VIP and DIP according to an embodiment. As shown in FIG. 3, and as previously described, both the DIP 310 and VIP 315 can be developed with reference to a specification such as a protocol, standard or other predefined design specification 305. Then, a programming model definition 320 may be developed, defining the register accesses for the DIP, including the protocol or specification related accesses 330 and the design specific accesses 325. The protocol related accesses may be defined in or derived from the specification compliant VIP 315.

According to an aspect of an embodiment, a DIP creator will populate or define a look-up table that identifies the design specific register accesses, including identifying any read/write commands that initiate such a register access. The table may be completely predefined by the DIP developer or may be populated incrementally, as the design specific accesses are identified or created.

Once the programming model definition 320 has been completed, a software stack 335 for testing the DIP may be created. The software stack 335 can be used with the VIP 315 to test compliance with the specification, and may be configured to have substantially similar timing with respect to the DIP. The software stack 335 includes specification specific software 345 that operates an interface according to the specification. Additionally, the software stack 335 includes design specific software 340 that operates the interface according to the defined design specific accesses.

Then, using the predefined design specific access information, normalization software 350 included in the software stack 335 can be used to seamlessly test the design specific accesses of an interface with the protocol specific accesses. For example, the normalization software 350 can rewrite the access definitions to a common form. Additional software may provide functionality to execute the read and write commands defined in the predefined design specific access information, functionality that polls the registers according the design specific access information, or functionality that throws an interrupt upon detection of a read/write command according to the design specific access information.

According to an embodiment, a VIP based software stack may be created preliminarily. Then, the software stack may be modified to also include design specific software based on the design specific programming model definition 325.

A software development team may use the created VIP based software stack during design IP software creation, test, verification, and validation. This allows for earlier and more accurate testing and verification of software such that whatever is done in hardware or software conforms to the specifications being implemented. Reuse of the software stack across verification services will aid in ensuring that the DIP works as expected and reduce the development time by avoiding creation of a relevant device specific software stack at each verification stage. Additionally, because the VIP based software stack will be available in advance of the IP component, software developers can test, compare, and contrast various software and operating systems on exemplary hardware DIP, for example, to test the inputs and outputs for communication via a known protocol, before the IP component is available.

Figure 4:
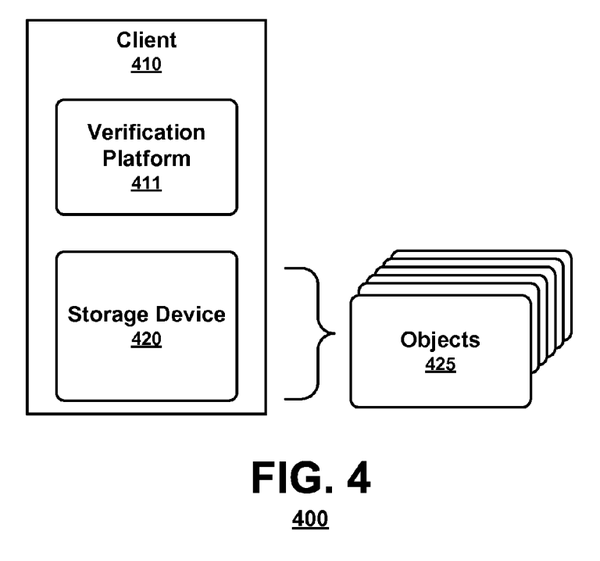
FIG. 4 is a simple block diagram illustrating components of an exemplary system according to an embodiment.

A user may access a simulation platform in a standalone client system, client-server environment, or a networked environment. FIG. 4 is a simple block diagram illustrating components of an exemplary system 400 according to an embodiment. As shown in FIG. 4, a system 400 may comprise a workstation or client 410 executing a simulation platform 411 and having a memory storage 420. The client 410 may be any computing system that executes a simulation platform 411 or otherwise facilitates access to memory storage 420, for example a personal computer. The client 410 may include a processor that performs a method in accordance with the disclosed embodiments. Such a client would be part of an overall simulation system in accordance with the disclosed embodiments.

Hardware designs, instruction sets, software packages, instances of modeled components, interface definitions, and other objects 425 used by the simulation platform 411 may be stored in memory storage 420. A user may access the objects 425 stored in memory storage 420 with the client 410 via the simulation platform 411, where the simulation platform 411 is capable of accessing memory storage 420 and displaying the objects 425 and the data associated with the simulation. The simulation platform 411 may include a user interface, for example a program, application or middleware that acts as a frontend to and facilitates access to objects in memory storage 420. The simulation platform 411 may facilitate verification of the components in a hardware design using the display and edit tools and procedures described herein. The user may interact with the simulation platform 411 through a number of input devices, such as by inputting a selection as with a mouse or inputting a request as with a keyboard. The user may observe the simulation results on an output device or display. The simulation platform 411 may run in an application window controlled by the user.

Memory storage may include a file system, hard drive, database, or any other method of storing data. According to an embodiment, multiple memory storage devices may be implemented (not shown). For example, design storage may contain the hardware design and related information and a separate simulation database may contain interface definitions and other objects used to run simulation tests on a hardware design.

As shown in FIG. 4, a client 410 may be a stand-alone system, as may be of particular interest where the design being simulated is confidential. Additionally, according to an aspect of an embodiment as shown in FIG. 5, a client 510 may be part of a networked environment.

Figure 5:
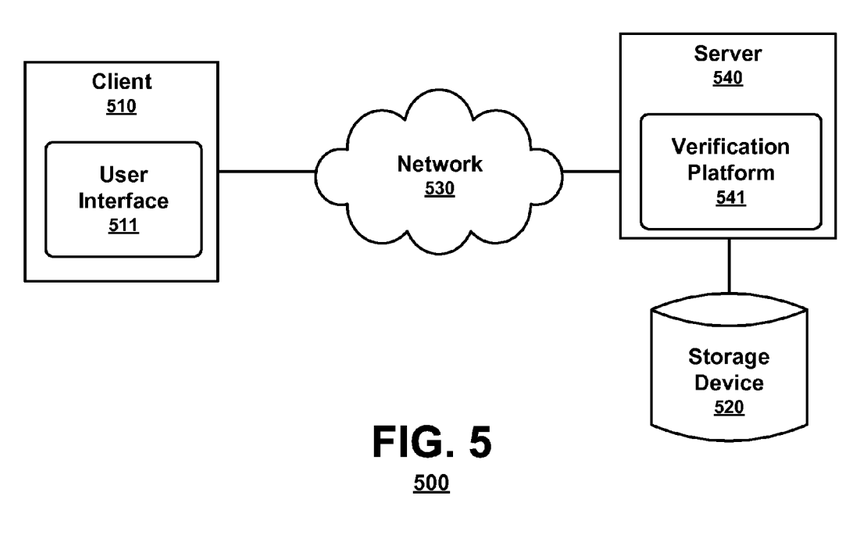
FIG. 5 is a simple block diagram illustrating components of an exemplary system according to an embodiment.

FIG. 5 is a simple block diagram illustrating components of an exemplary system 500 according to an embodiment. As shown in FIG. 5, system 500 may include a client 510 having a user interface 511. The client 510 may be connected to a server 540 via a network 530. The simulation platform 541, which in this embodiment is located at server 540, may have access to storage device 520 storing hardware designs, instruction sets, software packages, instances of modeled components, interface definitions, and other objects utilized by the simulation platform 541. The server 540 may include a processor that performs a method in accordance with the disclosed embodiments. Such a server then would be part of an overall simulation system in accordance with the disclosed embodiments.

A user may access a simulation platform 541 at the server 540 via the client 510 having a user interface 511 capable of accessing and displaying the components implemented as part of a hardware design and the results of the simulation of those components. The client 510 may be any computing system that facilitates the user accessing storage device 520, for example a personal computer. The network 530 may be a wired or wireless network that may include a local area network (LAN), a wireless network, the Internet, or any other network available for accessing storage device 520 from the client 510.

The server 540 may be a network server accessible to the client 510 via the network 530 that may manage access to storage device 520. The user interface 511 may receive instructions regarding simulation of a design from the user and utilizing the objects stored in memory storage 520, facilitate a display of the simulation or the information gathered during the simulation. Multiple different clients (not shown) may access storage device 520 via the network 530 and request access to the objects stored therein.

In another networked environment, the simulation platform may be executed on a network capable client and access the designs, packages and other objects stored in one or more storage devices via a network and communications server.

Figure 6:
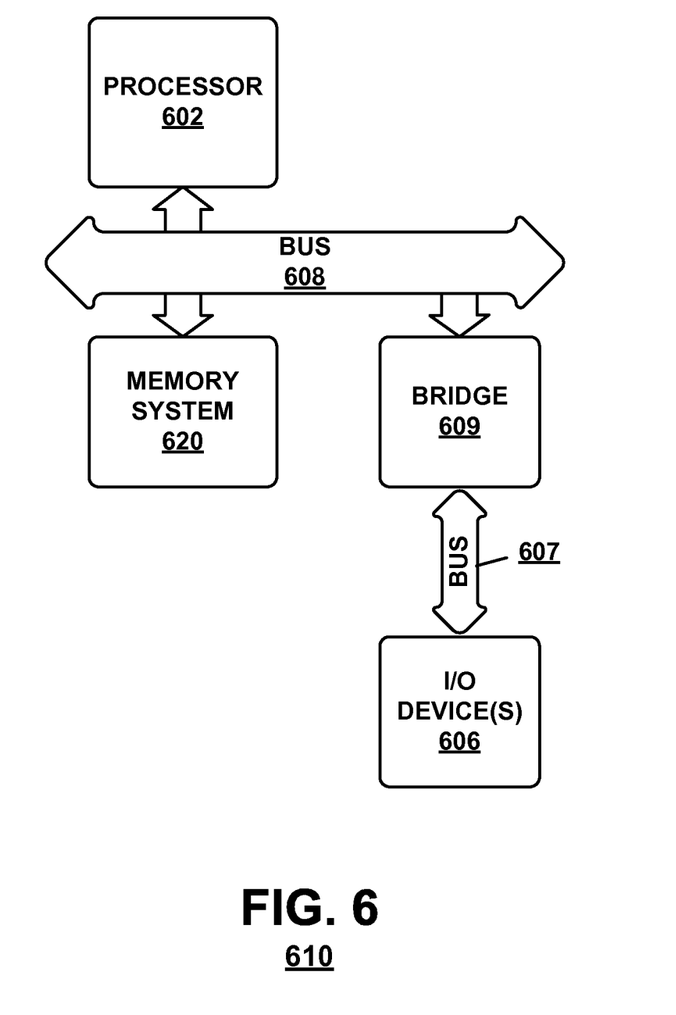
FIG. 6 is a simple block diagram illustrating components of an exemplary client according to an embodiment.

FIG. 6 is a simple block diagram illustrating components of an exemplary client 610 according to an embodiment. As shown in FIG. 6, the client 610 configured to execute the simulation platform as described herein may include a processor 602, a memory system 620 and one or more input/output (I/O) devices 606 in communication. The communication can be implemented in a variety of ways and may include one or more computer buses 607, 608 and/or bridge devices 609 as shown in FIG. 6. According to an aspect of an embodiment, the I/O devices 606 can include network adapters and/or mass storage devices from which the client 610 can receive commands for executing the phases of verification.

As shown in FIG. 4, a client 610 may be a stand-alone system, as may be of particular interest where the components being simulated are confidential. Additionally, according to an aspect of an embodiment as shown in FIG. 5, a client 610 may be part of a networked environment.

In some applications, the modules described hereinabove may be provided as elements of an integrated software system, in which the blocks may be provided as separate elements of a computer program. Some embodiments may be implemented, for example, using a non-transitory computer-readable storage medium or article which may store an instruction or a set of instructions that, if executed by a processor, may cause the processor to perform a method in accordance with the embodiments. Other applications of the present invention may be embodied as a hybrid system of dedicated hardware and software components. Moreover, not all of the modules described herein need be provided or need be provided as separate units. Additionally, it is noted that the arrangement of the blocks in FIG. 3 does not necessarily imply a particular order or sequence of events, nor is it intended to exclude other possibilities. Such implementation details are immaterial to the operation of the present invention unless otherwise noted above.

The exemplary methods and computer program instructions may be embodied on a non-transitory computer readable storage medium that may include any medium that can store information. Examples of a computer readable storage medium include electronic circuits, semiconductor memory devices, ROM, flash memory, erasable ROM (EROM), floppy diskette, CD-ROM, optical disk, hard disk, fiber optic medium, or any electromagnetic or optical storage device. In addition, a server or database server may include computer readable media configured to store executable program instructions. The features of the embodiments of the present invention may be implemented in hardware, software, firmware, or a combination thereof and utilized in systems, subsystems, components or subcomponents thereof.

While the invention has been described in detail above with reference to some embodiments, variations within the scope and spirit of the invention will be apparent to those of ordinary skill in the art. Thus, the invention should be considered as limited only by the scope of the appended claims.

We claim:

1. A computer-implemented method of simulating a hardware design that includes a third party IP component, the method comprising:
creating, with a processor, a software stack to manage register accesses during simulation, wherein at least one register access is defined in a specification implemented in the third party IP component and at least one register access that is specific to the third party IP component;
creating, with the processor, a representation of the third party IP component, wherein the representation is configured to have substantially similar functionality and timing with respect to the third party IP component, wherein the representation is created based on the specification implemented in the third party IP component; and
simulating, with the processor, the design, wherein the representation simulates the register accesses using the created software stack.

2. The method of claim 1, further comprising generating a programming model definition that defines register accesses for the third party IP component, wherein the software stack is created with reference to a programming model definition.

3. The method of claim 2, wherein the programming model definition comprises at least one specification defined register access definition and at least one third party IP component specific register access definition.

4. The method of claim 3, wherein the at least one third party IP component specific register access is predefined by a developer of the third party IP component.

5. The method of claim 4, wherein the at least one third party IP component specific register access is predefined in a look-up table.

6. The method of claim 3, wherein the at least one third party IP component specific register access definition is added to the programming model definition after the third party IP component has been tested.

7. The method of claim 1, wherein said creating further comprises normalizing the at least one third party IP component specific access with the at least one specification defined register access.

8. The method of claim 1, wherein said creating further comprises:
creating a verification IP (VIP) based software stack to manage register accesses consistent with VIP generated according to the specification; and
modifying the VIP based software stack to manage the at least one third party IP component specific register access.

9. A non-transitory computer readable medium storing instructions that, when executed by a processor, perform a method of simulating a hardware design that includes a third party IP component, the method comprising:
creating a software stack to manage register accesses during simulation, wherein at least one register access is defined in a specification implemented in the third party IP component and at least one register access that is specific to the third party IP component;
creating, with the processor, a representation of the third party IP component, wherein the representation is configured to have substantially similar functionality and timing with respect to the third party IP component, wherein the representation is created based on the specification implemented in the third party IP component; and
simulating, with the processor, the design, wherein the representation simulates the register accesses using the created software stack.

10. The non-transitory computer readable medium of claim 9, further comprising generating a programming model definition that defines register accesses for the third party IP component, wherein the software stack is created with reference to a programming model definition.

11. The non-transitory computer readable medium of claim 10, wherein the programming model definition comprises at least one specification defined register access definition and at least one third party IP component specific register access definition.

12. The non-transitory computer readable medium of claim 11, wherein the at least one third party IP component specific register access is predefined by a developer of the third party IP component.

13. The non-transitory computer readable medium of claim 9, wherein said creating further comprises normalizing the at least one third party IP component specific register access with the at least one specification defined register access.

14. The non-transitory computer readable medium of claim 9, wherein said creating further comprises:
   creating a verification IP (VIP) based software stack to manage register accesses consistent with VIP generated according to the specification; and
   modifying the VIP based software stack to manage the at least one third party IP component specific register access.

15. A system comprising:
   a memory to store an integrated circuit design that includes a third party IP component; and
   a processor configured to simulate the design by:
   creating a software stack to manage register accesses during simulation, wherein at least one register access is defined in a specification implemented in the third party IP component and at least one register access that is specific to the third party IP component;
   creating, with the processor, a representation of the third party IP component, wherein the representation is configured to have substantially similar functionality and timing with respect to the third party IP component, wherein the representation is created based on the specification implemented in the third party IP component; and
   simulating, with the processor, the design, wherein the representation simulates the register accesses using the created software stack.

16. The system of claim 15, wherein the processor is further configured to generate a programming model definition that defines register accesses for the third party IP component, wherein the software stack is created with reference to programming model definition.

17. The system of claim 15, wherein the programming model definition comprises at least one specification defined register access definition and at least one third party IP component specific register access definition.

18. The system of claim 17, wherein the at least one third party IP component specific register access is predefined by a developer of the third party IP component.

19. The system of claim 15, wherein the processor is further configured to normalize the at least one third party IP component specific register access with the at least one specification defined register access.

20. The system of claim 15, wherein the processor is further configured to:
   create a verification IP (VIP) based software stack to manage register accesses consistent with VIP generated according to the specification; and
   modify the VIP based software stack to manage the at least one third party IP component specific register access.

* * * * *